(12) United States Patent
Berding et al.

(10) Patent No.: US 6,934,126 B1
(45) Date of Patent: Aug. 23, 2005

(54) DISK DRIVE INCLUDING A BASE ASSEMBLY HAVING A FLEX-TO-BOARD EDGE CONNECTOR

(75) Inventors: Keith R. Berding, San Jose, CA (US); Shawn E. Casey, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 215 days.

(21) Appl. No.: 10/328,586

(22) Filed: Dec. 23, 2002

(51) Int. Cl.[7] ............................ G11B 33/12; G11B 5/54
(52) U.S. Cl. ............................ 360/264.2; 360/97.01
(58) Field of Search ........................ 360/97.01, 97.02, 360/264.2, 264.3, 264.1; 439/67, 493

(56) References Cited

U.S. PATENT DOCUMENTS

| | | | | |
|---|---|---|---|---|
| 5,426,549 A | * | 6/1995 | Sakai ........................ | 360/264.2 |
| 5,583,720 A | * | 12/1996 | Ishida et al. .............. | 360/97.01 |
| 5,583,721 A | * | 12/1996 | Kim .......................... | 360/97.01 |
| 5,609,496 A | * | 3/1997 | Kilmer et al. .............. | 439/271 |
| 5,646,801 A | * | 7/1997 | Boigenzahn et al. ..... | 360/97.01 |
| 5,655,285 A | * | 8/1997 | Bonn et al. ............... | 29/603.03 |
| 5,701,220 A | * | 12/1997 | Koriyama ................. | 360/264.2 |
| 5,905,609 A | * | 5/1999 | Butler et al. .............. | 360/264.8 |
| 5,907,452 A | * | 5/1999 | Kan .......................... | 360/97.01 |
| 5,909,338 A | * | 6/1999 | Butler et al. .............. | 360/97.01 |
| 5,923,501 A | * | 7/1999 | Suzuki et al. ............. | 360/264.2 |
| 5,953,183 A | * | 9/1999 | Butler et al. .............. | 360/264.2 |
| 6,665,149 B2 | * | 12/2003 | Abe .......................... | 360/264.2 |
| 6,771,470 B1 | * | 8/2004 | Yagi ......................... | 360/264.2 |
| 2003/0147180 A1 | * | 8/2003 | Rosner et al. ............ | 360/264.2 |

* cited by examiner

*Primary Examiner*—Brian E. Miller
(74) *Attorney, Agent, or Firm*—Milad G. Shara, Esq.; Alan W. Young, Esq.

(57) ABSTRACT

A disk drive comprises a housing including a base; a disk rotatably attached to the base; a printed circuit board coupled to the base and including a plurality of circuit board pads; a head stack assembly pivotally coupled to the base about a pivot axis and a flex-to-board connector. The head stack assembly includes a head for reading and writing to the disk and a flex cable assembly that includes a flexible film including a plurality of conductive traces that are electrically coupled to the head. The flexible film includes a connecting portion in which each of the plurality of conductive traces defines a trace pad. Each trace pad is disposed on a surface of the flexible film that is generally parallel to the pivot axis. The flex-to-board connector is attached to the base and is configured to couple to the connecting portion of the flexible film and to maintain the surface of the flexible film on which the trace pads are disposed in an orientation that is generally parallel to the pivot axis. The flex-to-board connector includes a plurality of conductive fingers, each configured to electrically connect one of the trace pads to a corresponding one of the plurality of circuit board pads.

48 Claims, 5 Drawing Sheets

DISK DRIVE INCLUDING A BASE ASSEMBLY HAVING A FLEX-TO-BOARD EDGE CONNECTOR

BACKGROUND OF THE INVENTION

1. Field of the Invention

This invention relates to magnetic disk drives. More particularly, the present invention relates to disk drives and components thereof that include a novel flex-to-board connector that electrically connects the heads of a head stack assembly with connection pads on the drive's printed circuit board assembly.

2. Description of the Prior Art and Related Information

Magnetic disk drives, such as those used for mass storage in personal computer systems are well known. Generally, such disk drives include a head disk assembly (HDA) and a controller printed circuit board (PCBA). The HDA includes a cover, a base, one or more disks and a head stack assembly (HSA). The HSA rotatably positions a slider (head) having one or more read and write transducers over a disk. The HSA is controllably positioned by a servo system to read or write information from or to particular tracks on the disk. The typical HSA has three primary portions: (1) an actuator assembly that moves in response to the servo control system; (2) a head gimbal assembly (HGA) that extends from the actuator assembly and biases the slider toward the disk; and (3) a flex cable assembly that provides an electrical interconnect between the slider (via the drive's preamp) and the PCBA with minimal constraint on movement. A typical HGA includes a load beam, a gimbal attached to an end of the load beam, and a slider attached to the gimbal. The load beam has a spring function that provides a "gram load" biasing force and a hinge function that permits the slider to follow the surface contour of the spinning disk. The load beam has an actuator end that connects to the actuator arm and a gimbal end that connects to the gimbal that supports the slider and transmits the gram load biasing force to the slider to "load" the slider against the disk. A rapidly spinning disk develops a laminar airflow above its surface that lifts the slider away from the disk in opposition to the gram load biasing force. The slider is said to be "flying" over the disk when in this state.

The HSA is internal to the HDA in a very clean environment. The PCBA, however, is outside the HDA—and outside the clean environment. One problem faced by hard disk drive designers is how best to electrically connect the HSA to the PCBA without compromising the clean environment of the HDA, and to do so in a reliable, readily manufacturable and inexpensive manner. The head stack in a disk drive rotates around a pivot axis, and a flat flexible cable is required to allow for the pivot motion while maintaining the electrical connection. This requirement places the major surfaces of the flat flexible cable in a vertical orientation.

FIGS. 1, 2 and 3 show various aspects of conventional head stack assemblies and flexible cable to board connectors. Considering now FIGS. 1–3 collectively, the actuator assembly portion of the HSA is shown at 120. The conventional actuator assembly 120 includes an actuator body 38 from which one or more actuator arms 44 are cantilevered. Cantilevered from the actuator body 38 in the opposite direction from the actuator arms 44 is a coil portion 40. Extending from the body portion 38 is a flex cable guide 162. The flex cable guide 162 guides a flat flexible cable 152 away from the actuator and toward a flex bracket 154 that is configured to fit within a cutout 156 within the base of the disk drive. The flat flexible cable 152 carries electrical signals from the slider (via the preamp 87) to the PCBA 14. Toward that end, conventional disk drives typically guide the flat flexible cable 152 into a flex bracket such as shown at 154 and bend the flat flexible cable 152 into a horizontal orientation around the flex bracket 154 and solder the trace pads of the flexible cable 152 to a connector 155 attached to the flex bracket 154. Indeed, whereas the flat flexible cable 152 leaves the flex cable guide 162 in a vertical orientation (i.e., oriented in the y direction shown in FIG. 2), the flat flexible cable is bent 90 degrees (as best shown in FIG. 3 that shows a simplified representation of the underside of the flex bracket 154 and that of the connector 155 and the manner in which the flat flexible cable 152 is bent) into a horizontal orientation (i.e., oriented in the x direction shown in FIG. 2). The flat flexible cable 152 is conventionally soldered to the connector 155. Conventionally, a gasket seal 160 is interposed between the flex bracket 154 and the base. Screws, shown at 158 in FIG. 2, are conventionally used to force the flex bracket 154 and gasket seal 160 against the base so that the contacts 157 of connector 155 make compression contacts directly with the appropriate circuit board pads of the PCBA 14.

Such conventional designs have a number of disadvantages. For example, as the flat flexible cable 152 (a polyimide film with embedded conductive traces) must be bent around the L-shaped flex bracket 154, the flexible cable 152 must be cut in a corresponding L-shape. This shape reduces the number of such flat flexible cables that may be cut from a given rectangular sheet of such polyimide material. Another disadvantage relates to the screws 158. The use of such fasteners entails the need to create screw tap holes in the base. Moreover, the act of driving the screws 158 generates particulates that may adversely affect the operation of the drive. Eliminating the screws 158 would eliminate the risk of generating such particulates, as well as reduce component costs of the drive. Eliminating the need for the gasket seal 160 would also similarly reduce component costs and thus reduce the overall cost of the drive. In conventional HSAs, the flat flexible cable 152 is attached to the actuator assembly 120 as well as soldered to the connector 155. In practical terms, this means that the actuator assembly 120 includes the attached flex cable 152 as well as the soldered-on connector 155. The actuator assembly must then be pivotally installed on a pivot-bearing cartridge 34 and the flex bracket 154 must be fitted within a hole in the base so that the contacts 157 of the connector 155 may make electrical contact with pads on the PCBA 14. This hole in the base creates a potential leak path that increases the possibility of particulate or other contamination within the clean environment of the HDA.

Clearly, there is a need to redesign the interface between the HSA and the PCBA. Such an interface should address the above-discussed disadvantages of the conventional connector assembly, should forego the use of screws for cleanliness and drive reliability, should allow for simple assembly in a high volume process, should use inexpensive components, should provide reliable electrical contacts at the required impedance and should allow the connector to be grounded to the base, among other desirable characteristics.

SUMMARY OF THE INVENTION

According to one aspect thereof, an embodiment of this invention may be regarded as a disk drive, comprising a disk drive housing including a base; a disk rotatably attached to the base; a printed circuit board coupled to the base and including a plurality of circuit board pads and a head stack assembly pivotally coupled to the base about a pivot axis. The head stack assembly may include a head for reading and writing to the disk and a flex cable assembly that includes a flexible film including a plurality of conductive traces that are electrically coupled to the head, the flexible film including a connecting portion in which each of the plurality of conductive traces defines a trace pad, each trace pad being disposed on a surface of the flexible film that is generally parallel to the pivot axis. The disk drive also includes a flex-to-board connector attached to the base, the flex-to-board connector being configured to couple to the connecting portion of the flexible film and to maintain the surface of the flexible film on which the trace pads are disposed in an orientation that is generally parallel to the pivot axis, the flex-to-board connector including a plurality of conductive fingers, each conductive finger being configured to electrically connect one of the trace pads to a corresponding one of the plurality of circuit board pads.

The flex-to-board connector may be attached to the base by an adhesive, such as an epoxy, for example. The flex cable assembly may include a stiffener disposed against the flexible film behind the trace pads, the stiffener being configured to stiffen the connecting portion of the flexible film. The stiffener may include a prehensible feature configured to enable a human or a mechanical manipulator to selectively insert and remove the connecting portion in and from the flex-to-board connector. A protective structure may be disposed around the plurality of conductive fingers. The flex-to-board connector may also include a retention feature configured to enable the connecting portion of the flexible film to be selectively coupled and decoupled from the flex-to-board connector. Each of the conductive fingers may define a superior portion above the base and an inferior portion disposed between the base and the printed circuit board, and the inferior portion may define a radius of curvature. The superior portion of each of the conductive fingers may be configured to resiliently apply a bias force against a trace pad. The inferior portion of each of the conductive fingers may be configured to resiliently apply a bias force against a circuit board pad. The flex-to-board connector further may include at least one post to relieve a stress on the flexible film.

Embodiments of the present invention may also include a base assembly for a hard disk drive, comprising a base, the base being configured to enable an actuator assembly to be pivotally attached thereto about a pivot axis, the base including features configured to receive a printed circuit board, the printed circuit board including a plurality of printed circuit board pads, and a flex-to-board connector attached to the base, the flex-to-board connector being configured to couple to a flex cable attached to the actuator assembly and to maintain a surface of the flex cable on which trace pads are disposed in an orientation that is generally parallel to the pivot axis, the flex-to-board connector being configured to electrically couple each of the trace pads of the flex cable to a corresponding one of the printed circuit board pads.

The flex-to-board connector may include a plurality of conductive fingers, each conductive finger being configured to electrically connect one of the trace pads to a corresponding one of a plurality of circuit board pads on the circuit board. The flex-to-board connector may be configured so as to enable the flex cable to be coupled to the flex-to-board connector in a top-down fashion. The flex-to-board connector may be attached to the base by an adhesive, such as an epoxy, for example. The flex-to-board connector may be configured to couple to a flex cable assembly that includes a stiffener disposed against the flex cable behind the trace pads, the stiffener being configured to stiffen the connecting portion of the flexible film. The stiffener may include a prehensible feature configured to enable a human or a mechanical manipulator to selectively insert and remove the connecting portion in and from the flex-to-board connector. The flex-to-board connector further may include a protective structure around the plurality of conductive fingers. The flex-to-board connector may further comprise a retention feature configured to enable the connecting portion of the flexible film to be selectively coupled and decoupled from the flex-to-board connector. Each of the conductive fingers may define a superior portion above the base and an inferior portion between the base and the printed circuit board, and the inferior portion may define a radius of curvature. The superior portion of each of the conductive fingers may be configured to resiliently apply a bias force against a trace pad. Similarly, the inferior portion of each of the conductive fingers may be configured to resiliently apply a bias force against a circuit board pad. The flex-to-board connector may further include at least one post to relieve a stress on the flex cable.

DESCRIPTION OF PREFERRED EMBODIMENTS

Figure 4:
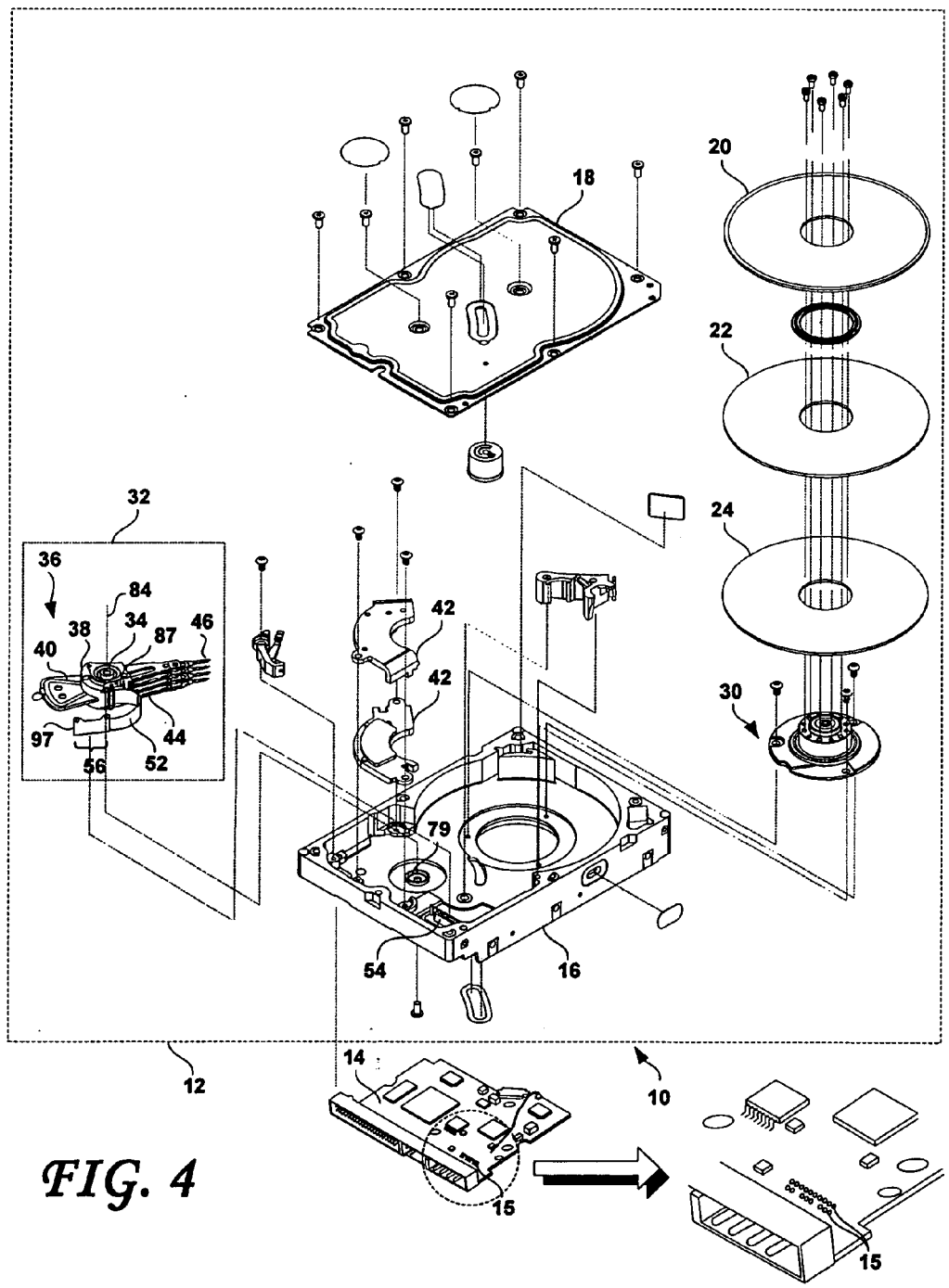
FIG. 4 is an exploded view of a hard disk drive according to an embodiment of the present invention.

FIG. 4 is an exploded perspective view of a disk drive 10 according to an embodiment of the present invention. As shown, the disk drive 10 includes a HDA 12 and a PCBA 14. The HDA 12 includes a disk drive base 16 and a cover 18 that collectively house one or more magnetic disks, such as shown at 20, 22, 24. Each magnetic disk 20, 22, 24 contains a plurality of tracks for storing data. The head disk assembly 12 further includes a spindle motor 30 for rotating the magnetic disks 20, 22, 24. The head disk assembly 12 further includes a HSA 32 and a pivot-bearing cartridge 34. The head stack assembly 32 includes a rotary actuator 36.

The rotary actuator 36 includes an actuator body 38 that defines a bore and a pivot-bearing cartridge 34 is engaged within the bore to pivot the rotary actuator 36 between limited positions about pivot axis 84. The rotary actuator 36 further includes a coil portion 40 that extends from one side of the actuator body 38 to interact with a pair of permanent magnets 42 to form a Voice Coil Motor (VCM) for pivoting the rotary actuator 36. A plurality of actuator arms, the lowermost one of which being denoted 44, extend from an opposite side of the actuator body 38. Alternatively, a single actuator arm 44 may extend from the actuator body 38. As the disks (or single disk) 20, 22, 24 may be two sided, each of the actuator arms 44 is attached to either one or two head gimbal assemblies associated with the adjacent sides of the disks 20, 22, 24. Each head gimbal assembly includes a head (the uppermost one being denoted 46) for reading and writing data to and from a respective recording surface of one of the respective disks 20, 22, 24.

Figures 1, 2, 3:
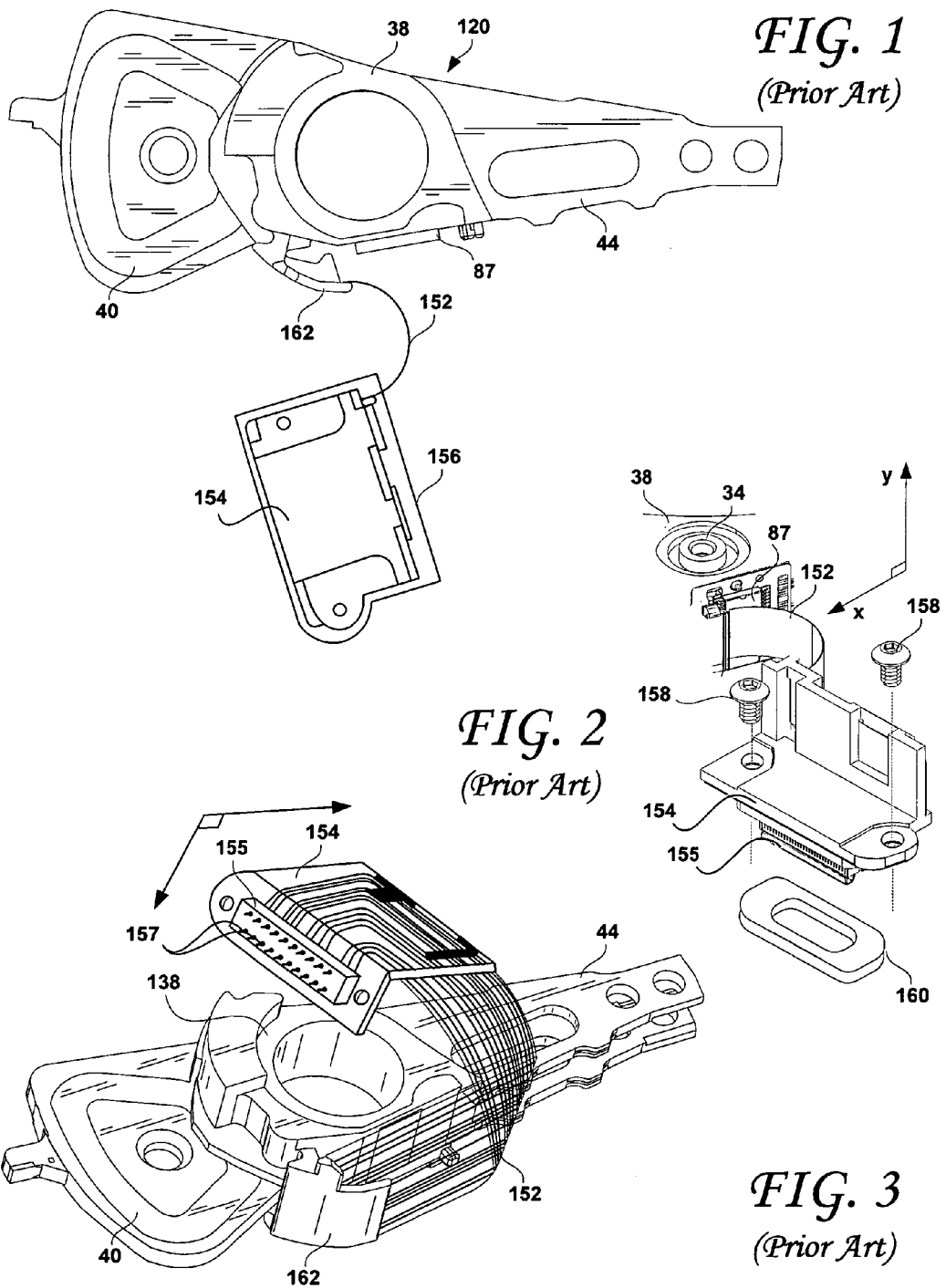
FIG. 1 is a plan view of a conventional actuator and flex circuit and flex circuit to base connector.
FIG. 2 is a perspective view of a conventional flex-to-board connector assembly.
FIG. 3 is a perspective view of the conventional actuator assembly of FIG. 1, with the flex circuit and the conventional flex-to-base connector raised and twisted, so as to illustrate the 90-degree bending of the flat flexible cable required by conventional flex-to-base connectors.

Unlike conventional disk drives in which the flex cable is bent 90 degrees from an orientation that is parallel to the pivot axis 84 to an orientation that is perpendicular thereto (and thus parallel to the base 16), embodiments of the present invention maintain the flex cable 52 in the orientation wherein it is parallel to the pivot axis 84. The flex cable assembly includes a flexible film that includes a plurality of conductive traces that are electrically coupled to the drive's preamp 87 (shown in FIGS. 2 and 4) and thereafter to the head (slider). According to embodiments of the present invention, the flex cable 52 includes a connecting portion 56 configured to (preferably removably) couple to a flex-to-board connector 54 attached to the base 16. Each of the plurality of conductive traces within the flex cable 52 defines a trace pad in the connecting portion 56. The connecting portion of the flex cable 52, unlike the flex cables in conventional HSAs, is maintained in an orientation that is generally parallel to the pivot axis 84. That is, the trace pads defined within the connecting portion 56 of the flex cable 52 are disposed on a surface of the flex cable 52 that is generally parallel to the pivot axis 84 about which the HSA 32 pivots.

As shown in FIG. 4, the flex-to-board connector 54 is attached to the base 16, preferably before the HSA 32 is mounted to the base 16. The flex-to-board connector 54 is configured to removably couple to (i.e., selectably couple to and uncouple from) the trace pads of the connecting portion 56 of the flex cable 52 to the corresponding circuit board pads 15 on the PCBA 14 and to maintain the surface of the flex cable 52 on which the trace pads are disposed in an orientation that is generally parallel to the pivot axis 84. Toward that end, the flex-to-board connector 54 may include a plurality of conductive fingers, each of which is configured to electrically connect one of the trace pads of the connecting portion 56 of the flex cable 52 to a corresponding one of the plurality of circuit board pads 15 of the PCBA 14, in the manner discussed herein below.

Figure 5:
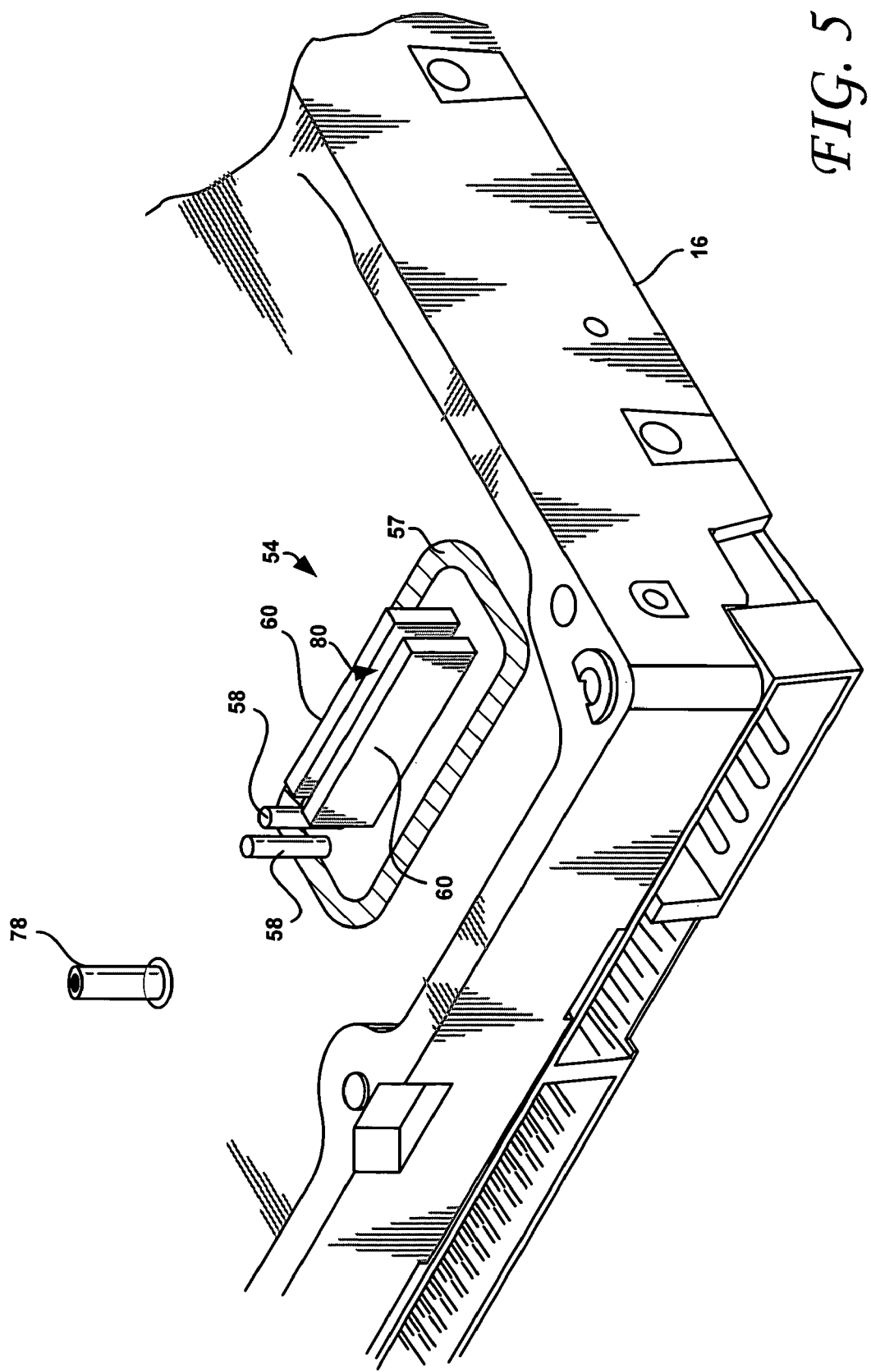
FIG. 5 is a perspective view of a portion of a base of a disk drive incorporating the flex-to-board connector according to an embodiment of the present invention, shown prior to the HSA being mated thereto.

FIG. 5 is a perspective view of a portion of a base 16 of a disk drive according to an embodiment of the present invention, showing a flex-to-board connector 54 attached to the base 16 prior to the actuator and flex cable assemblies of the HSA 32 being mated thereto. According to embodiments of the present invention, the flex-to-board connector 54 is preferably attached to the base 16 prior to the actuator and flex cable assemblies being mounted thereon. This, among other benefits, enables the base 16 and the connector 54 to be assembled away from the disk pack and the HSA, both of which are very susceptible to contamination that may result from the mounting of connectors to the base 16. According to embodiments of the present invention, the flex-to-board connector 54 may be attached to the base 16 not by screws or other fasteners but preferably by means of an adhesive 57 such as, for example, epoxy. After the flex-to-board connector 54 has been placed into position on the base 16 and the applied adhesive 57 been allowed to cure, the base 16 may be subjected to cleaning by means of, for example, an aqueous solution. This post-connector install cleaning is not available in conventional drives, as the HSA assembly includes a flex bracket and connector assembly that must be installed onto the base 16 along with the actuator assembly on a locational feature such as male locational feature 78 in FIG. 5 or female locational feature 79 in FIG. 4. Another advantage of the present flex-to-board connector 54 is that the adhesive layer 57 securing the connector 54 to the base 16 completely isolates the clean environment of the HSA from the comparatively less clean environment in which the PCBA 14 is disposed. Therefore, no leak path exists around the connector 54 exists, in contradistinction with the case wherein a connector (such as shown at 154 in FIG. 2) is inserted in a hole defined within the base 16 and secured thereto by means of bracket 154 and screws 158. The use of the adhesive 57 also has the advantage of obviating the need for the gasket seal shown at 160 in FIG. 2. Eliminating this part advantageously reduces the overall cost of the drive and simplifies the assembly process thereof.

As shown, the present flex-to-board connector 54 may include one or more posts 58. The function of the posts 58 is to locate the starting point of and to limit the bending of the flex cable 52 attached to the actuator assembly, as well as to limit the stresses on the flex cable 52. Constraining the bending of the flex cable 52 by such posts 58 or functionally similar structures limits the changes in bias torque that the flex cable 52 exerts on the attached actuator assembly. The present flex-to-board connector 54 may include one or more protective structures 60 that rise in the y direction—that is, in a direction that is perpendicular to the internal flat major surface of the base 16. In FIG. 5, the flex-to-board connector 54 includes two such protective structures 60, configured as two parallel walls that are separated from one another so as to create a space 80 therebetween. The width of the space 80 is at least sufficient to accommodate the connecting portion 56 of the flex cable 52. The protective structure(s) 60 protect means for electrically connecting the trace pads of the connecting portion 56 to the PCBA circuit board pads 15 (see FIG. 4) on the PCBA 14 mounted underneath the base 16.

Figure 6:
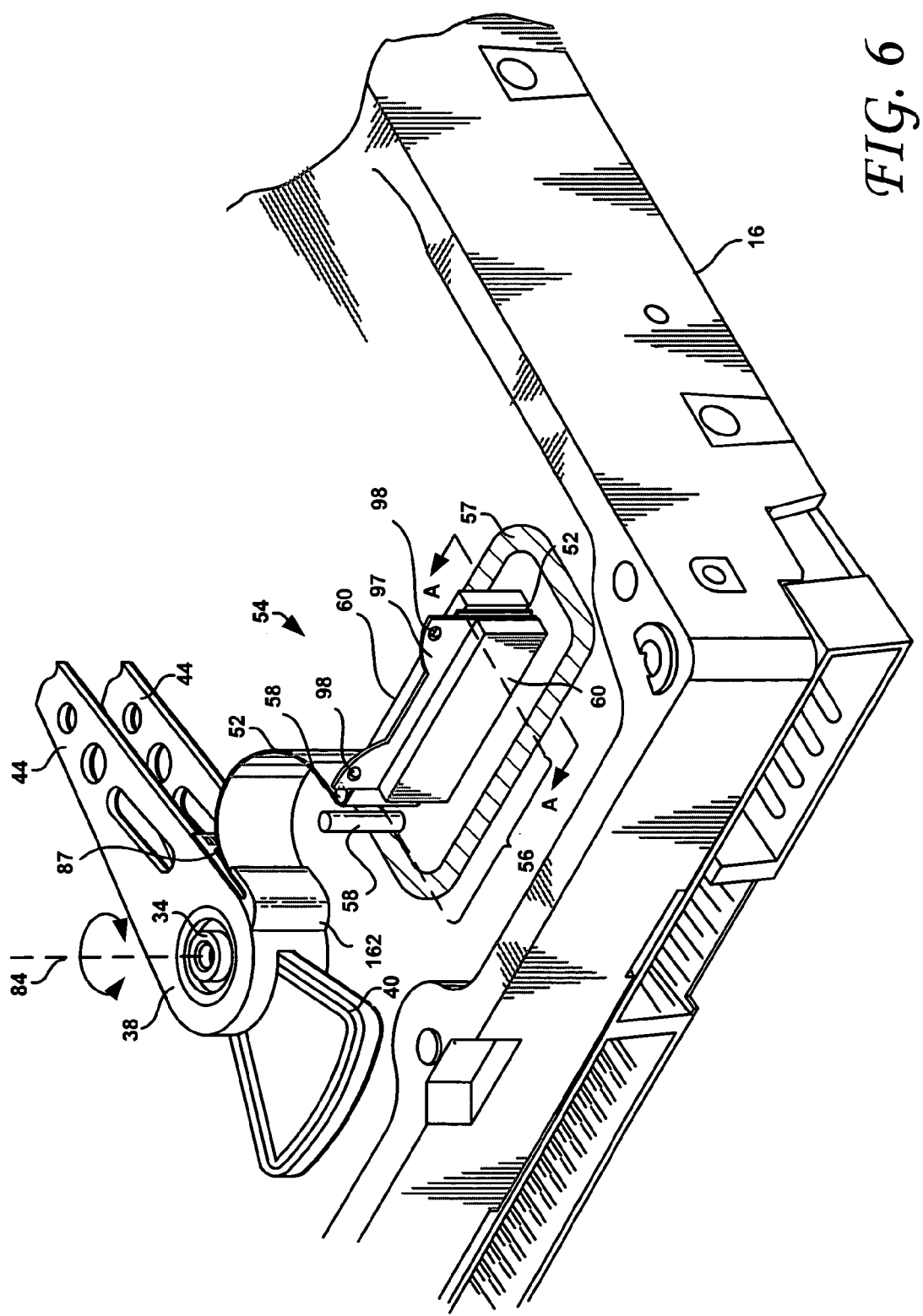
FIG. 6 is a perspective view of a portion of a base of a disk drive incorporating the flex-to-board connector according to an embodiment of the present invention, shown after the actuator assembly has been mounted thereon and the flex cable coupled to the present flex-to-board connector.

FIG. 6 is a perspective view of a portion of a base 16 of a disk drive 10 incorporating the flex-to-board connector 54 according to an embodiment of the present invention, shown after the actuator assembly has been mounted thereon and the flex cable 52 coupled to the present flex-to-board connector 54. As shown, the actuator assembly, including the pivot-bearing cartridge 34, has been mounted on post 78 (see FIG. 5) or similar locational feature (such as female locational 79 in FIG. 4) on the base 16. The actuator assembly is free to pivot between limited positions about pivot axis 84. The flex cable 52, terminated by the connecting portion 56, is allowed to follow a gently arcuate path toward the present flex-to-board connector 54. The connecting portion 56 (in which the trace pads of the flex cable 52 are defined) is aligned with the connector 54 and inserted within the space 80 thereof in such a manner that the surface on which the trace pads are disposed is parallel to the pivot axis 84 of the actuator assembly. That is, the connecting portion 56 of the flex cable 52 is inserted edge-wise into the connector 54, and does not bend such that the surface in which the trace pads are defined is in an orientation that is perpendicular to the actuator pivot axis 84, as in conventional disk drives. Since there is no need for the flex cable 52 to define an L-shape at its terminal end, a greater number of such flex cables may be cut from a single rectangular sheet of flex cable material of a given size, thereby reducing the component costs thereof. The present flex-to-board connector 54 is grounded, preferably to the base 16 by means of a grounding strap secured to the screw that secures the PCBA 14 to the base 16, or by other means known in the art. For example, the adhesive that secures the flex-to-board connector 54 to the base 16 may include a conductive epoxy.

Figure 7:
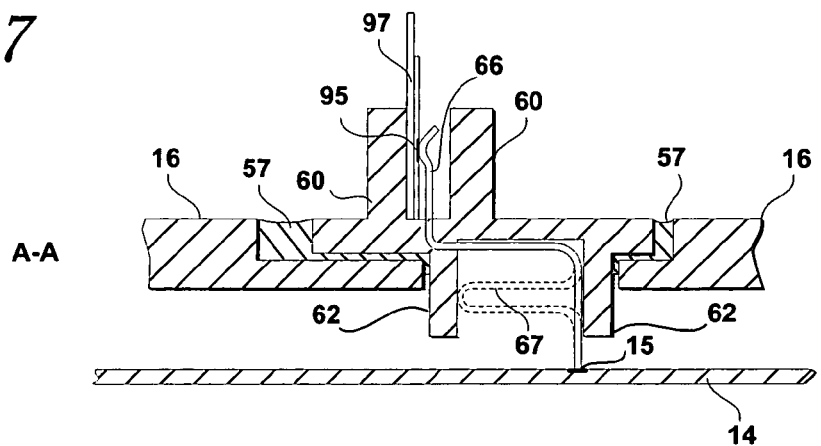
FIG. 7 is a cross-sectional view of the flex-to-board connector of FIG. 6, taken along cross-sectional line AA.
Figure 9:
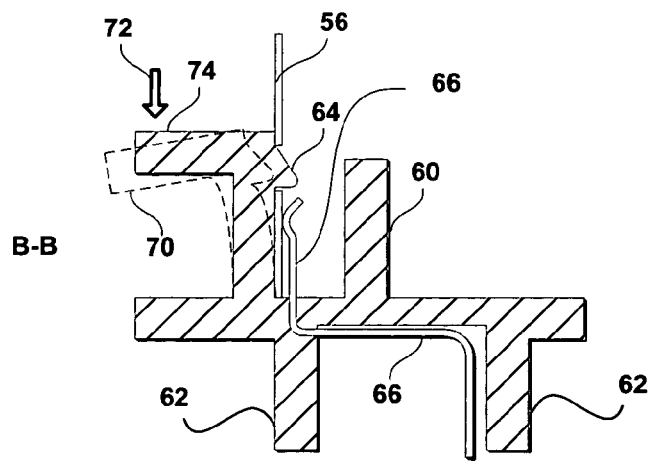
FIG. 9 is cross-sectional view of the flex-to-board connector of FIG. 8, taken along cross-sectional lines BB.

FIG. 7 is a cross-sectional view of the present flex-to-board connector 54 of FIG. 6, taken along cross-sectional line AA. The present flex-to-board connector 54 includes a plurality of conductive fingers, one of which is shown in FIG. 7 at 66. The conductive fingers May be arranged in a single row or may be arranged in two rows (either aligned or staggered), for example. Each such conductive finger 66 is configured to electrically connect one of the trace pads in the connecting portion 56 of the flex cable 52 (one of which is shown in FIG. 7 at 95) to a corresponding one of the plurality of circuit board pads 15 on the PCBA 14. Also as shown, the conductive fingers 66 may be configured so as to exert a biasing force against the connecting portion 56, so as to maintain the connecting portion 56 of the flex cable 52 firmly in place within the flex-to-board connector 54. The connecting finger 66, as shown, extends through the base 16 to electrically connect the trace pads 95 defined on the flex cable 52 to the circuit board pads 15 on the PCBA 14. To accommodate the aggregate sum of the tolerances of the respective positions and sizes of (at least) the flex-to-board connector 54, the base 16 and the PCBA 14, the conductive fingers 66 each may define a resilient looping portion that forms a radius of curvature (as shown at 67 in dashed lines) that enables the conductive fingers 66 to exert a predetermined force at a predetermined displacement. Therefore, the conductive fingers 66 may be formed so as to yield to accommodate the tolerances of the various structures with which it interacts and still make and maintain the necessary compression contact with the PCBA pads 15 of the PCBA 14. The shape of the conductive fingers, 66 shown in FIGS. 7 and 9 is exemplary only, it being understood that the shape of the conductive fingers 66 may be varied from that shown without departing from the claimed invention. FIG. 7 clearly illustrates that the clean environment of the HSA (above and within the base 16) is physically isolated from the comparatively less clean environment of the PCBA 14 by the adhesive (e.g., epoxy) shown at 57. As also shown in FIG. 7, the flex-to-board connector 54 may include a second protective structure or structures 62 to protect that portion of the conductive fingers 66 that extends to contact the PCBA pads 15 from damage during assembly and/or re-work of the drive. To prevent crumpling the thin flexible film of the flex cable 52 during edge-wise insertion thereof into the flex-to-board connector 54, the connecting portion 56 thereof may be reinforced with a stiffener, as shown at 97 in FIGS. 4, 6 and 7. This stiffener 97 may be secured to the connecting portion 56 of the flex cable 52, preferably to the surface thereof that is opposite the surface on which the trace pads 95 are disposed. The stiffener 97 may be attached to the connecting portion 56 by means of an adhesive, for example. For example, the stiffener 97 may be formed of Kapton® polyimide material (manufactured by DuPont), or may be formed of some other rigid material. To make it easier to manipulate the connecting portion 56, the stiffener 97 may include prehensible features 98, such as ears and/or through holes, as best shown in FIG. 6. Such prehensible features 98 enable human hands to easily hold or insert the assembly comprising the connecting portion 56 and the stiffener 97 into the flex-to-board connector 54 or enable mechanical manipulators to readily do the same.

Figure 8:
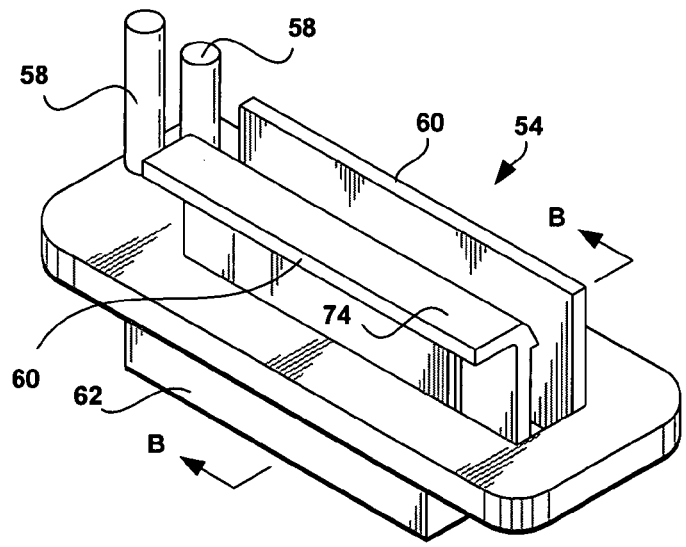
FIG. 8 is a perspective view of a flex-to-board connector, according to another embodiment of the present invention.

FIGS. 8 and 9 show another embodiment of the present flex-to-board connector 54. FIG. 9 is shown without the stiffener 97, although it is understood that such a stiffener 97 may also be used in this embodiment. As shown, the flex-to-board connector 54 of FIG. 8 includes a retention feature. The retention feature includes a projection 64 (see FIG. 9) that is configured to line up with and go through a corresponding hole or slot defined in the flex cable 52. To enable re-work of the present disk drive, the retention feature is preferably configured to enable the unlocking thereof. In the embodiment shown in FIGS. 8 and 9, a force on the shelf 74 of the protecting structure 60 directed substantially as indicated by arrow 72 will cause the wall of protecting structure 60 to bend as shown at 70 in dashed lines. This bending releases the projection 64 of the retention feature 74 from the hole(s) or slot(s) defined in the flex cable 52 and enables the connecting portion 56 thereof to be retracted from the flex-to-board connector 54. The retention feature, the shelf 74 and/or the projection 64 may run the entire length of the protecting structure 60, but need not do so. For example, a small projection may be formed on opposing ends of one or both protecting structures 60, the remaining portion thereof being formed as shown in FIGS. 6 and 7, without such projection(s).

Preferably, the flex-to-board connector 54 is attached to the base 16 (thereby forming a base assembly) and cleaned before the HSA is secured thereto. In practical terms, this means that the base manufacturer will likely be the party to attach the flex-to-board connector to the base. The base manufacturer may then ship the base assembly (now including the attached flex-to-board connector 54) to the disk drive manufacturer, who will then add the HSA, the PCBA and the cover 18 to complete the disk drive. The disk drive manufacturer, therefore, would not need to drive screws into the base 16, and will have the ability to snap-fit the connecting portion 56 of the flex cable 52 directly into the flex-to-board connector 54 in an efficient top-down fashion. Embodiments of the present invention also advantageously eliminate, as alluded to above, the sealing gasket 160 and also eliminates the requirement to solder the trace pads of the flex cable to the (conventional) flex bracket 154.

We claim:

1. A disk drive, comprising:
   a disk drive housing including a base;
   a disk rotatably attached to the base;
   a printed circuit board coupled to the base and including a plurality of circuit board pads;
   a head stack assembly pivotally coupled to the base about a pivot axis, the head stack assembly including:
      a head for reading and writing to the disk;
      a flex cable assembly, including a flexible film including a plurality of conductive traces that are electrically coupled to the head, the flexible film including a connecting portion in which each of the plurality of conductive traces defines a trace pad, each trace pad being disposed on a surface of the flexible film that is generally parallel to the pivot axis, and
      a flex-to-board connector attached to the base, the flex-to-board connector being configured to couple to the connecting portion of the flexible film and to maintain the surface of the flexible film on which the trace pads are disposed in an orientation that is generally parallel to the pivot axis, the flex-to-board connector including a plurality of conductive fingers, each conductive finger being configured to electrically connect one of the trace pads to a corresponding one of the plurality of circuit board pads.

2. The disk drive of claim 1, wherein the flex-to-board connector is attached to the base by an adhesive.

3. The disk drive of claim 2, wherein the adhesive includes an epoxy.

4. The disk drive of claim 1, wherein the flex cable assembly includes a stiffener disposed against the flexible film behind the trace pads, the stiffener being configured to stiffen the connecting portion of the flexible film.

5. The disk drive of claim 4, wherein the stiffener includes a prehensible feature configured to enable a human or a mechanical manipulator to selectively insert and remove the connecting portion in and from the flex-to-board connector.

6. The disk drive of claim 1, further including a protective structure around the plurality of conductive fingers.

7. The disk drive of claim 1, further comprising a retention feature configured to enable the connecting portion of the flexible film to be selectively coupled and decoupled from the flex-to-board connector.

8. The disk drive of claim 7, wherein the inferior portion of each of the conductive fingers is configured to resiliently apply a bias force against a circuit board pad.

9. The disk drive of claim 1, wherein each of the conductive fingers defines a superior portion above the base and an inferior portion that is disposed between the base and the printed circuit board and wherein the inferior portion defines a radius of curvature.

10. The disk drive of claim 9, wherein the superior portion of each of the conductive fingers is configured to resiliently apply a bias force against a trace pad.

11. The disk drive of claim 1, wherein the flex-to-board connector further includes at least one post to relieve a stress on the flexible film.

12. A base assembly for a hard disk drive, comprising:
a base, the base being configured to enable an actuator assembly to be pivotally attached thereto about a pivot axis, the base including features configured to receive a printed circuit board, the printed circuit board including a plurality of printed circuit board pads, and
a flex-to-board connector attached to the base, the flex-to-board connector being configured to couple to a flex cable attached to the actuator assembly and to maintain a surface of the flex cable on which trace pads are disposed in an orientation that is generally parallel to the pivot axis, the flex-to-board connector being configured to electrically couple each of the trace pads of the flex cable to a corresponding one of the printed circuit board pads, the flex-to-board connector including a plurality of conductive fingers, each conductive finger being configured to electrically connect one of the trace pads to a corresponding one of a plurality of circuit board pads on the circuit board.

13. The base assembly of claim 12, wherein the flex-to-board connector is configured so as to enable the flex cable to be coupled to the flex-to-board connector in a top-down fashion.

14. The base assembly of claim 12, wherein the flex-to-board connector is attached to the base by an adhesive.

15. The base assembly of claim 14, wherein the adhesive includes an epoxy.

16. The base assembly of claim 12, wherein the flex-to-board connector is configured to couple to a flex cable assembly that includes a stiffener disposed against the flex cable behind the trace pads, the stiffener being configured to stiffen the connecting portion of the flexible film.

17. The base assembly of claim 16, wherein the stiffener includes a prehensible feature configured to enable a human or a mechanical manipulator to selectively insert and remove the connecting portion in and from the flex-to-board connector.

18. The base assembly of claim 12, wherein the flex-to-board connector further includes a protective structure around the plurality of conductive fingers.

19. The base assembly of claim 12, wherein the flex-to-board connector further comprises a retention feature that is configured to enable the connecting portion of the flex cable to be selectively coupled and decoupled from the flex-to-board connector.

20. The base assembly of claim 12, wherein each of the conductive fingers defines a superior portion above the base and an inferior portion that is configured to be disposed between the base and the printed circuit board and wherein the inferior portion defines a radius of curvature.

21. The base assembly of claim 20, wherein the superior portion of each of the conductive fingers is configured to resiliently apply a bias force against a trace pad.

22. The base assembly of claim 20, wherein the inferior portion of each of the conductive fingers is configured to resiliently apply a bias force against a circuit board pad.

23. The base assembly of claim 12, wherein the flex-to-board connector further includes at least one post to relieve a stress on the flex cable.

24. A base assembly for a hard disk drive, comprising:
a base, the base being configured to enable an actuator assembly to be pivotally attached thereto about a pivot axis, the base including features configured to receive a printed circuit board, the printed circuit board including a plurality of printed circuit board pads, and
a flex-to-board connector attached to the base by an adhesive, the flex-to-board connector being configured to couple to a flex cable attached to the actuator assembly and to maintain a surface of the flex cable on which trace pads are disposed in an orientation that is generally parallel to the pivot axis, the flex-to-board connector being configured to electrically couple each of the trace pads of the flex cable to a corresponding one of the printed circuit board pads.

25. The base assembly of claim 24, wherein the flex-to-board connector includes a plurality of conductive fingers, each conductive finger being configured to electrically connect one of the trace pads to a corresponding one of a plurality of circuit board pads on the circuit board.

26. The base assembly of claim 25, wherein the flex-to-board connector further includes a protective structure around the plurality of conductive fingers.

27. The base assembly of claim 24, wherein the flex-to-board connector is configured so as to enable the flex cable to be coupled to the flex-to-board connector in a top-down fashion.

28. The base assembly of claim 24, wherein the adhesive includes an epoxy.

29. The base assembly of claim 24, wherein the flex-to-board connector is configured to couple to a flex cable assembly that includes a stiffener disposed against the flex cable behind the trace pads, the stiffener being configured to stiffen the connecting portion of the flexible film.

30. The base assembly of claim 29, wherein the stiffener includes a prehensible feature configured to enable a human or a mechanical manipulator to selectively insert and remove the connecting portion in and from the flex-to-board connector.

31. The base assembly of claim 29, wherein the stiffener includes a prehensible feature configured to enable a human or a mechanical manipulator to selectively insert and remove the connecting portion in and from the flex-to-board connector.

32. The base assembly of claim 24, wherein the flex-to-board connector further comprises a retention feature that is configured to enable the connecting portion of the flex cable to be selectively coupled and decoupled from the flex-to-board connector.

33. The base assembly of claim 25, wherein each of the conductive fingers defines a superior portion above the base and an inferior portion that is configured to be disposed between the base and the printed circuit board and wherein the inferior portion defines a radius of curvature.

34. The base assembly of claim 33, wherein the superior portion of each of the conductive fingers is configured to resiliently apply a bias force against a trace pad.

35. The base assembly of claim 33, wherein the inferior portion of each of the conductive fingers is configured to resiliently apply a bias force against a circuit board pad.

36. The base assembly of claim 25, wherein the flex-to-board connector further includes at least one post to relieve a stress on the flex cable.

37. A base assembly for a hard disk drive, comprising:
a base, the base being configured to enable an actuator assembly to be pivotally attached thereto about a pivot axis, the base including features configured to receive a printed circuit board, the printed circuit board including a plurality of printed circuit board pads, and
a flex-to-board connector attached to the base, the flex-to-board connector being configured to couple to a flex cable attached to the actuator assembly and to maintain a surface of the flex cable on which trace pads are disposed in an orientation that is generally parallel to the pivot axis, the flex-to-board, connector being configured to electrically couple each of the trace pads of the flex cable to a corresponding one of the printed circuit board pads, the flex to board connector further comprising a retention feature that is configured to enable the connecting portion of the flex cable to be selectively coupled and decoupled from the flex-to-board connector.

38. The base assembly of claim 37, wherein the flex-to-board connector includes a plurality of conductive fingers, each conductive finger being configured to electrically connect one of the trace pads to a corresponding one of a plurality of circuit board pads on the circuit board.

39. The base assembly of claim 38, wherein the flex-to-board connector further includes a protective structure around the plurality of conductive fingers.

40. The base assembly of claim 38, wherein each of the conductive fingers defines a superior portion above the base and an inferior portion that is configured to be disposed between the base and the printed circuit board and wherein the inferior portion defines a radius of curvature.

41. The base assembly of claim 40, wherein the superior portion of each of the conductive fingers is configured to resiliently apply a bias force against a trace pad.

42. The base assembly of claim 40, wherein the inferior portion of each of the conductive fingers is configured to resiliently apply a bias force against a circuit board pad.

43. The base assembly of claim 37, wherein the flex-to-board connector is configured so as to enable the flex cable to be coupled to the flex-to-board connector in a top-down fashion.

44. The base assembly of claim 37, wherein the flex-to-board connector is attached to the base by an adhesive.

45. The base assembly of claim 44, wherein the adhesive includes an epoxy.

46. The base assembly of claim 37, wherein the flex-to-board connector is configured to couple to a flex cable assembly that includes a stiffener disposed against the flex cable behind the trace pads, the stiffener being configured to stiffen the connecting portion of the flexible film.

47. The base assembly of claim 37, wherein the flex-to-board connector further comprises a retention feature that is configured to enable the connecting portion of the flex cable to be selectively coupled and decoupled from the flex-to-board connector.

48. The base assembly of claim 37, wherein the flex-to-board connector further includes at least one post to relieve a stress on the flex cable.

\* \* \* \* \*